United States Patent [19]
Morris

[11] Patent Number: 5,421,282
[45] Date of Patent: Jun. 6, 1995

[54] ARTIFICIAL FLOATING ISLAND

[76] Inventor: Richard D. Morris, 1440 Poinciana Ave., Ft. Myers, Fla. 33901

[21] Appl. No.: 167,062

[22] Filed: Dec. 16, 1993

[51] Int. Cl.⁶ .............................................. B63B 35/00
[52] U.S. Cl. ........................................................ 114/264
[58] Field of Search ............... 114/256, 264, 265, 266, 114/258, 121, 122, 123, 125; 14/2.6

[56] References Cited

U.S. PATENT DOCUMENTS

| | | |
|---|---|---|
| 1,667,255 | 4/1928 | Hermanson . |
| 1,908,714 | 5/1937 | Schneider ........................... 114/264 |
| 2,448,542 | 11/1949 | Houghtaling . |
| 2,488,542 | 11/1949 | Houghtaling ....................... 114/264 |
| 3,118,408 | 1/1964 | Knapp . |
| 3,276,209 | 10/1966 | Mosdell . |
| 3,426,109 | 2/1969 | Dempster . |
| 3,490,407 | 1/1970 | Dempster . |
| 3,719,048 | 3/1973 | Arne et al. ........................... 114/264 |
| 3,951,085 | 4/1976 | Johnson . |
| 4,067,285 | 1/1978 | Jones . |
| 4,155,323 | 5/1979 | Finsterwalder ..................... 114/264 |
| 4,683,833 | 8/1987 | Meriwether . |
| 4,887,654 | 12/1989 | Rytand . |
| 4,988,317 | 1/1991 | Rubinsak et al. . |
| 5,081,946 | 1/1992 | Nannig et al. . |
| 5,125,355 | 6/1992 | Stranzinger . |
| 5,199,371 | 4/1993 | Meriwether . |
| 5,215,027 | 6/1993 | Baxter . |
| 5,235,929 | 8/1993 | Chester et al. . |

FOREIGN PATENT DOCUMENTS

| | | |
|---|---|---|
| 0075840 | 6/1977 | Japan . |
| WO90/08059 | 7/1990 | WIPO . |

Primary Examiner—Stephen P. Avila
Attorney, Agent, or Firm—Richard C. Litman

[57] ABSTRACT

An artificial floating island is disclosed. The island includes a floating structure formed from a plurality of hollow island modules. Each module may have a platform and side walls for trapping air and providing buoyancy for the floating structure. The modules also include a plurality of shorter strengthening ribs to provide additional strength and safety. Adjacent island modules may be connected by hinge mechanisms to form the floating artificial island. An air supply mechanism may be connected to the sides of adjacent island modules to replenish air inside the hollow modules.

7 Claims, 9 Drawing Sheets

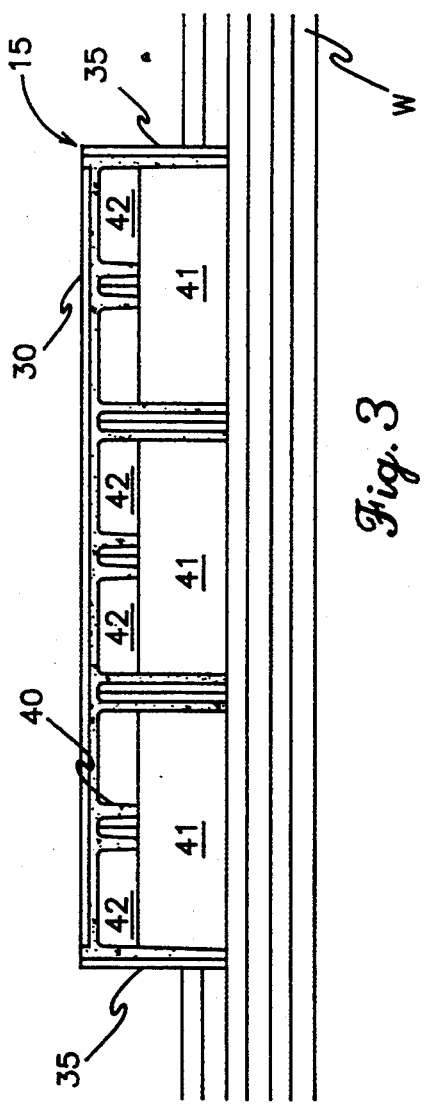
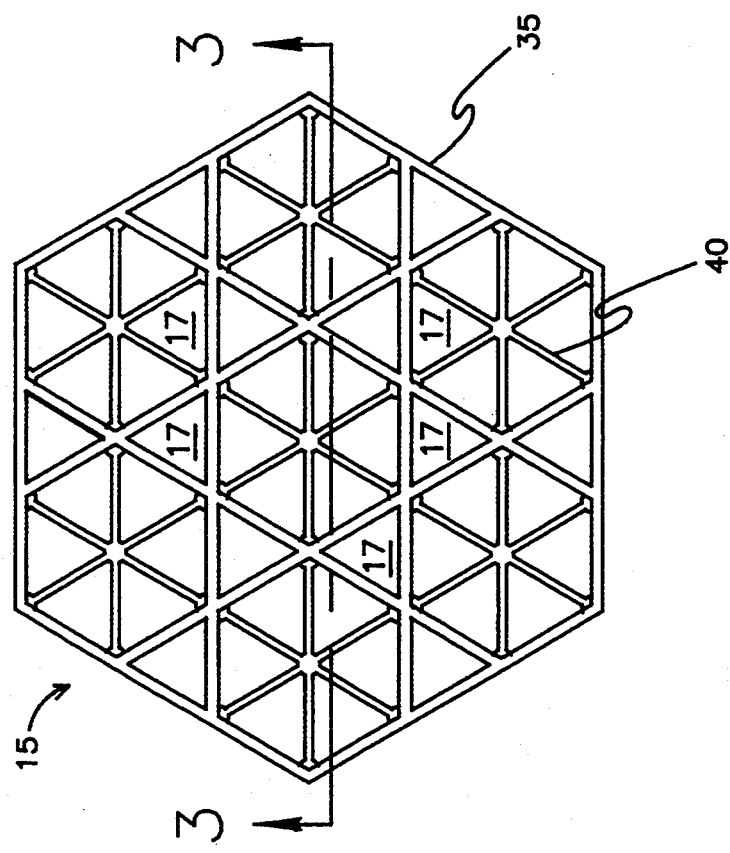
Fig. 3
Fig. 2

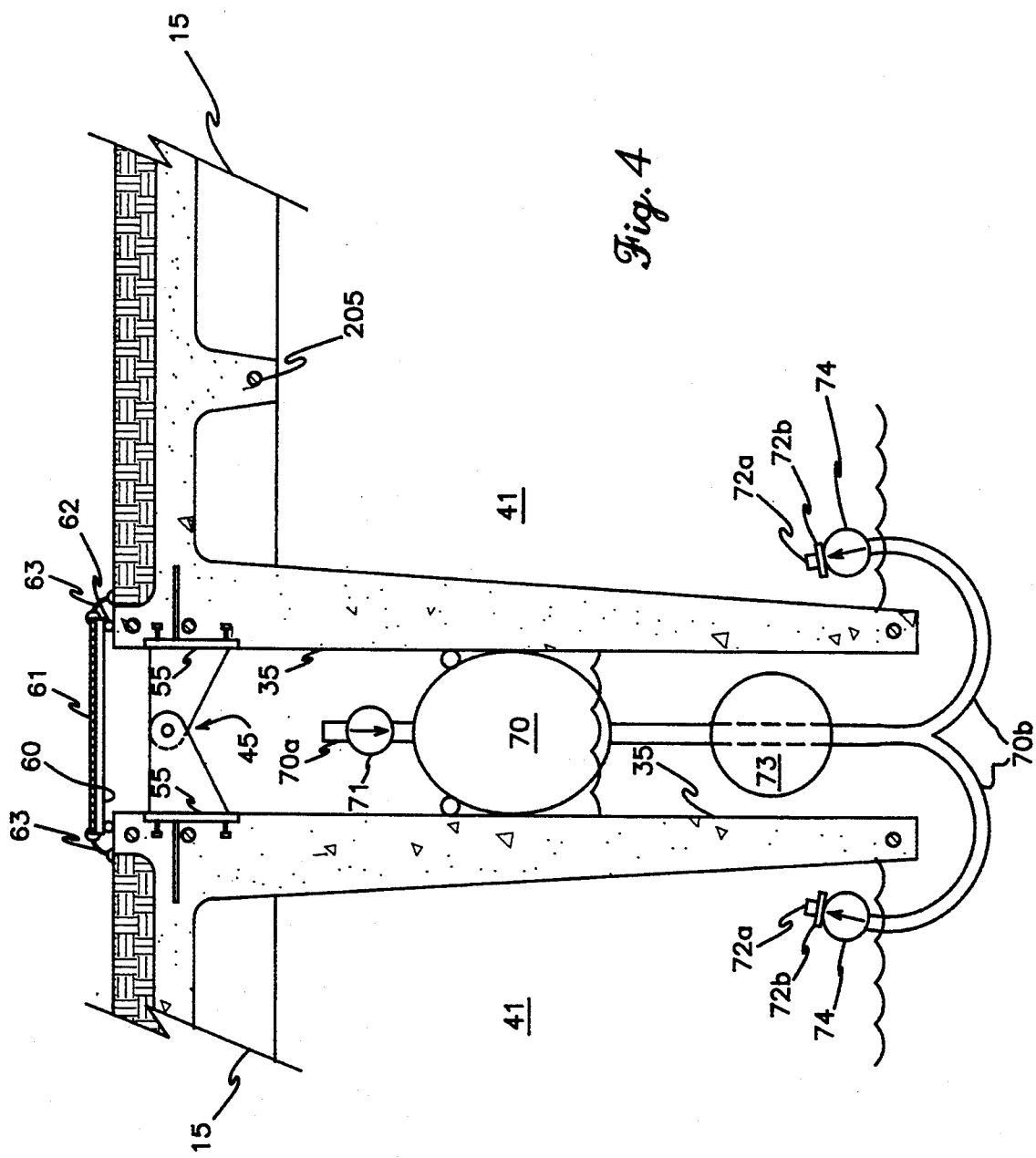

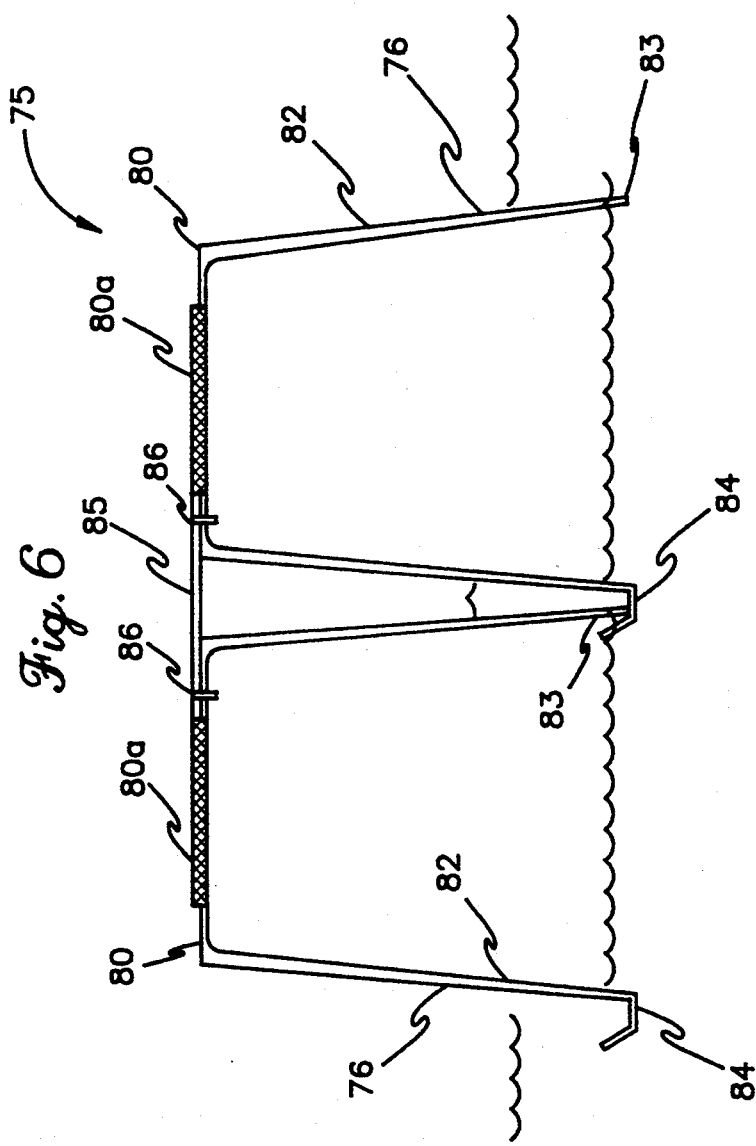
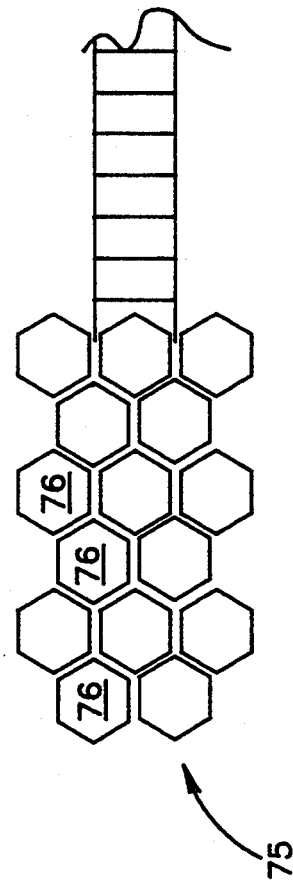

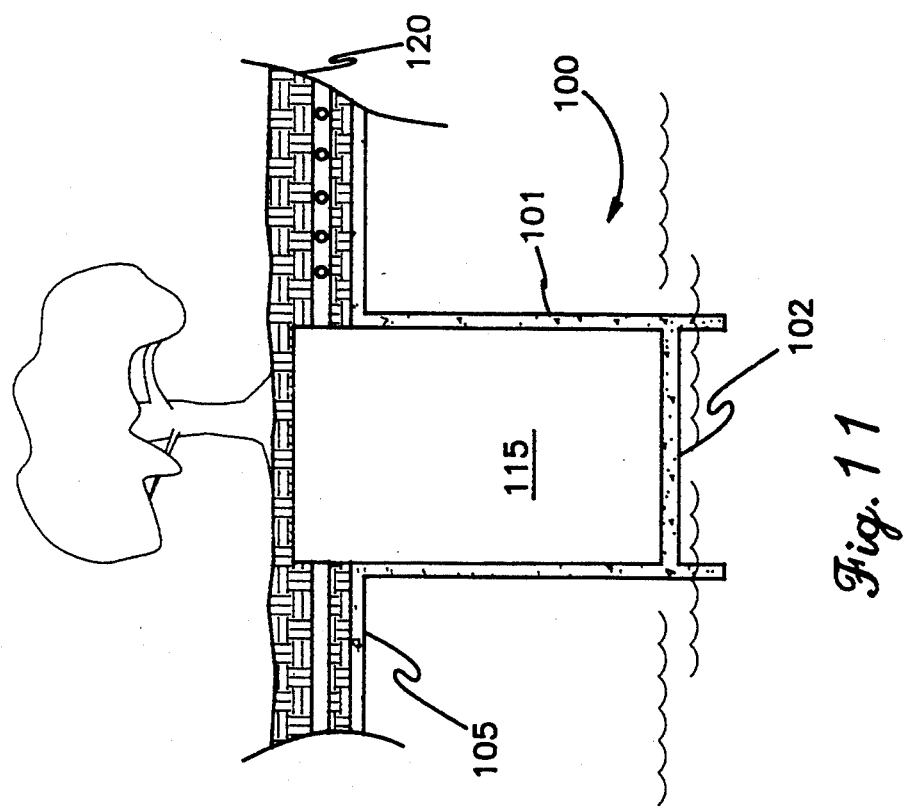
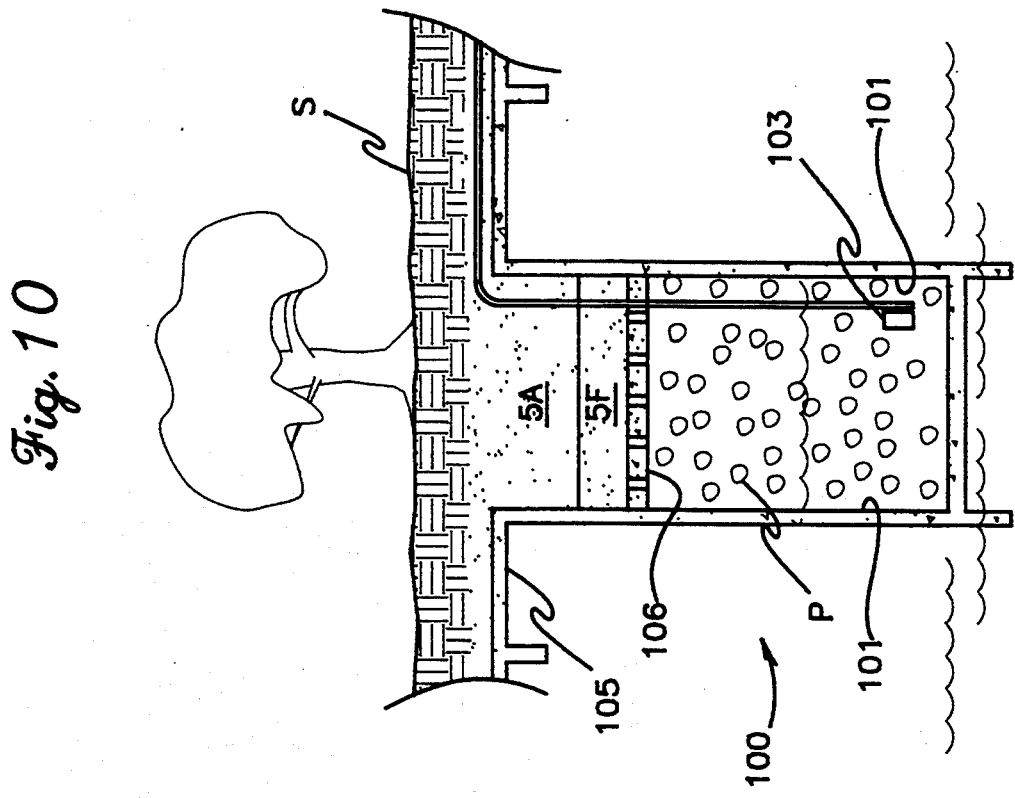

ARTIFICIAL FLOATING ISLAND

BACKGROUND OF THE INVENTION

1. Field of the Invention

The present invention relates generally to buoyant shells or modules, more specifically to a plurality of interconnected inverted, substantially airtight floating shells located in a body of water to form a platform for the construction of various superstructures thereon, and which may be used to form various structures ranging from relatively small docks to relatively large offshore metropolitan areas.

2. Description of the Prior Art

Almost three-quarters of the Earth's surface is covered by water. It would be desirable to claim some of these water regions as living space for human beings. An ideal solution for claiming water regions as living space would be an artificial floating island. In order to be feasible, such an island would be economical to build, require low maintenance, and would be a long lasting structure configured with docks, harbors and other features.

U.S. Pat. No. 1,667,255 issued to Oscar Hermanson on Apr. 24, 1928 discloses an Ocean Stage formed as a single, monolithic and rigid structure. The disclosure notes that the structure should be sufficiently large to serve as an aircraft landing field, which could raise questions relating to structural rigidity when constructed on such a large scale. Swells of long wavelength could cause undue stresses to form in such a large rigid structure.

U.S. Pat. No. 2,488,542 issued to Amer L. Houghtaling on Nov. 22, 1949 discloses an Artificial Island formed as a single, monolithic construction, in the manner of the Hermanson apparatus discussed above. The disclosure indicates that the Houghtaling structure would be from 1,000 to 2,000 feet across; hence, the same problems are evident here.

U.S. Pat. No. 3,118,408 issued to Richard P. Knapp on Jan. 21, 1964 discloses a Float For Use In Water comprising four buoyant cylinders joined to form an open square shape. Again, the structure is rigid and inflexible, and no mechanism is disclosed for joining a plurality of the devices together.

U.S. Pat. No. 3,276,209 issued to Daryl R. Mosdell on Oct. 4, 1966 discloses a Floating Marine Structure formed of a plurality of individual cells. However, the cells are all rigidly interconnected, unlike the present invention. The pin type interconnection of FIGS. 5 and 6 provides adjustment only for the lateral spacing between cells, rather than providing for their relative arcuate movement. The cells are closely spaced together and the individual cells are permanently bonded together. A rigid, monolithic deck is formed over the plurality of cells to complete the structure.

U.S. Pat. No. 3,426,109 issued to Harry E. Dempster on Feb. 4, 1969 discloses a Method Of Fabricating A Concrete Flotation Pier. The structure comprises a plurality of individual cells rigidly interconnected, unlike the present invention, and having a single, rigid, monolithic deck formed thereon. Each of the cells is completely enclosed, rather than having a bottom open to the water as in the present invention.

U.S. Pat. No. 3,490,407 issued to Harry E. Dempster on Jan. 20, 1970 is a divisional of U.S. Pat. No. 3,426,109 (see above) and discloses a Concrete Floating Structure as described in the first Dempster patent.

U.S. Pat. No. 3,951,085 issued to Don E. Johnson et al. on Apr. 20, 1976 discloses a Floating Structure Arrangement formed of a plurality of cast triangular shapes which are then rigidly joined together to form a larger structure. Again, the result is a rigid, monolithic structure with no mechanism providing for flexibility to adjust for wave action, as provided by the present invention.

U.S. Pat. No. 4,067,285 issued to Robert M. Jones et al. on Jan. 10, 1978 discloses a Modular Floating Structure formed of a plurality of triangular units rigidly secured together by tension members to form a single, rigid and inflexible structure.

Japanese Patent JA 0075840 issued to Kiyonori Kikutake on Jun. 25, 1977 discloses a Method of Building a Floating Structure for an Aquatic City Building and a Floating Structure. The structure comprises a plurality of individual cells rigidly interconnected, unlike the present invention, and having a single, rigid, monolithic deck formed thereon. The structure is rigid and inflexible, and no mechanism is disclosed for joining a plurality of the devices together.

Patent Cooperation Treaty Patent Application WO 90/08059 was filed by Ricardo Grechi Pacheco and published on Jul. 26, 1990. The application discloses a Floating Modulate Concrete Platform formed of a plurality of hexagonal units rigidly secured together by tension members to form a single structure. Each of the hexagonal units has a plurality of cell. The cells are completely enclosed, rather than having a bottom open to the water as in the present invention.

None of the above patents, taken either singly or in combination, is seen to describe the instant invention as claimed.

SUMMARY OF THE INVENTION

Accordingly, it is a principal object of the invention to provide an economical artificial floating island.

It is another object of the invention to provide a structure for use as a platform for the construction of houses and landscaping.

It is an object of the invention to provide improved elements and arrangements thereof in an apparatus for the purposes described which is inexpensive, dependable and fully effective in accomplishing its intended purposes.

An artificial floating island according to the invention may be formed from a plurality of hollow island modules. Each module includes a platform and side walls for trapping air and providing buoyancy for the floating structure. The modules also include strengthening ribs to provide additional strength for safety and rigidity. Adjacent island modules may be movably connected by hinge mechanisms with air supply mechanisms such as air compressors or self-inflating elastic bags, which may be connected to the sides of adjacent island modules to replenish air inside the hollow modules.

These and other objects of the present invention will become readily apparent upon further review of the following specification and drawings.

BRIEF DESCRIPTION OF THE DRAWINGS

FIG. 2 is a bottom plan view of a monolithic concrete module formed from a single placement of reinforced concrete;

FIG. 3 is a sectional view, taken along the line 3—3 of FIG. 2;

FIG. 4 is a sectional view showing the detail of a hinge connection between the modules, a boardwalk and an air supply mechanism;

FIG. 5 is a top plan view of attached floating dock modules;

FIG. 6 is a sectional view of adjacent dock modules;

FIG. 10 is an environmental front view in partial cross-section of a sump built into a module and used for growing trees and storing water;

FIG. 11 is an environmental front view in partial cross-section of a sump built into a module and used as a septic tank;

DETAILED DESCRIPTION OF THE PREFERRED EMBODIMENTS

Figure 1:
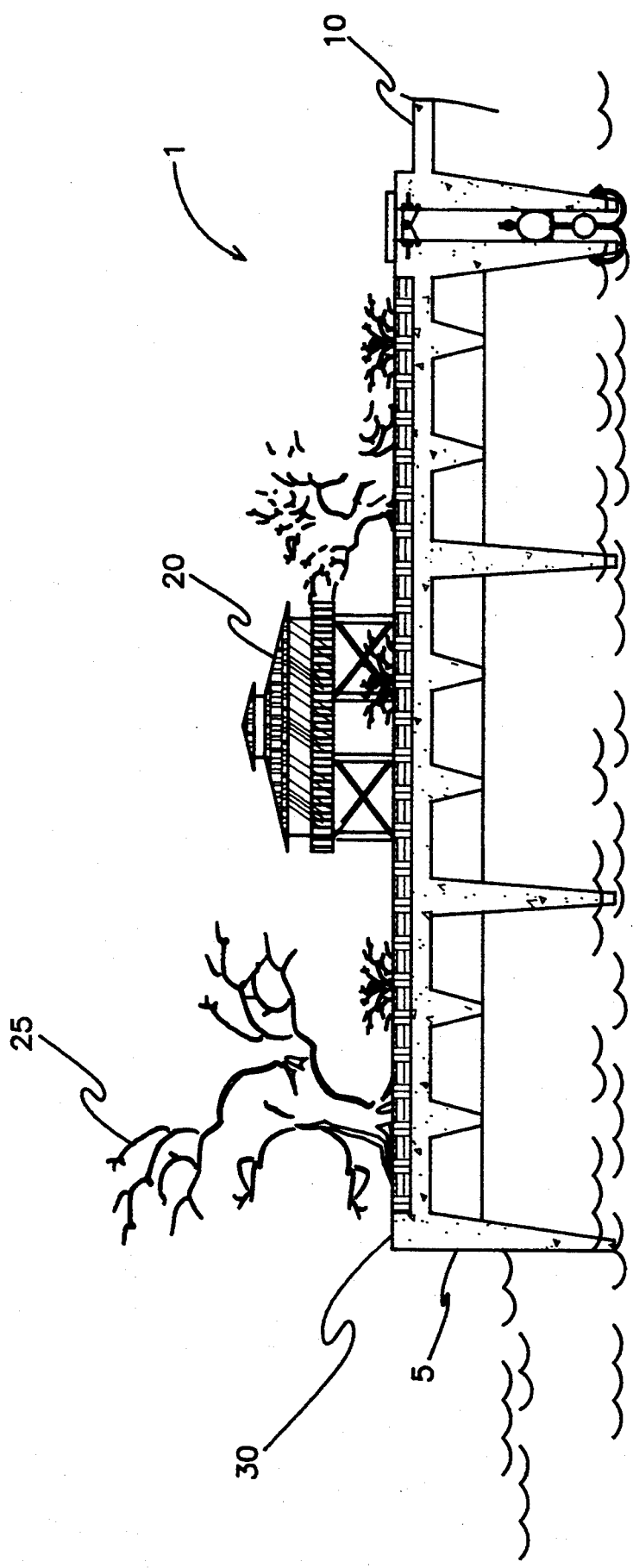
FIG. 1 is an environmental front view in partial cross-section of a single module attached to an adjacent module according to the instant invention.

An artificial floating island 1, as shown in FIG. 1, which may include a hollow module 5 connected to adjoining module 10, according to the present invention. A superstructure 20 and landscape 25 may be built on platform 30 of a module 5. The island may be constructed using a single module or a plurality of modules. The modules may be of any polygonal shape, i.e., such as rectangles, circles or squares. As shown in FIG. 2, a basic building structure for the island may be configured as a hexagonal module 15 configured as a single structure formed from concrete with steel reinforcement bars.

FIGS. 2 and 3 show a single module 15 in detail. The module may include smaller triangular cells 17 formed in reinforced concrete. Each module may be constructed to provide primary walls 35 and secondary walls 40. The primary walls 35 extend into a body of water W, from the platform 30 and form air cells 41 that provide buoyancy for the island. The secondary walls 40 extend downward from the platform 30 to produce secondary cells 42. Each module may be constructed of concrete, reinforced throughout with prestressed epoxy coated steel reinforcing bars.

The secondary walls 40 are shorter than the primary walls 35 and normally do not extend into the water W. These secondary walls 40 or strengthening ribs provide the advantage of increased strength and rigidity for the individual module. In addition, the secondary cells 42 formed by the secondary walls 40 help ensure that a minimum air pocket is maintained, in the event that part of the air in the primary cell is lost resulting in the module's height out of the water being reduced to the height of the secondary walls 40.

According to the preferred embodiment; as shown in FIG. 4, adjacent modules 15,15 are connected by a hinge 45 located near a top of the peripheral primary walls 35 of adjacent modules. A metal plate 55 may be bolted or formed to a primary wall of a module. The hinge 45 is then welded to the plates 55,55. A boardwalk 60 including a nonslip surface 61 spans adjacent modules 15,15 of the artificial floating island to allow a user to access the various modules.

It is contemplated that the modules may move under the influence of waves in the body of water. The boardwalk 60 may be flexibly connected to each of adjacent modules by a tether 63 or flexible rope. It is also contemplated to movably locate the boardwalk 60 on bearings or rollers 62 that may be mounted in slots (not shown) in the boardwalk and modules.

The volume of gas, such as air, within a primary cell 41 may diminish by wave action and the dissolving of air into the water. To replenish the air, an air supply mechanism or air bag 70 may be connected to and float between the adjacent modules. The air bag 70 may be configured of an elastomeric material that expands to a predetermined volume.

A check valve 71 may be located at an inlet 70a on the top of the air bag 70, so air may only flow into the top of the air bag 70. Each of two air lines 70b is connected to the air bag 70 and runs to one of the primary cells 41,41. When wave action causes the modules 15 to move together, the air bag 70 is compressed between the module walls 35, forcing air out of the air bag 70 into the primary cells 41,41. A bumper 73, which may be configured as a soft, flotation element, may be connected to the air bag outlet 70 to ensure that the lower free end of a module wall 35 does not contact and damage the wall of another module 35 during relative movement between the modules.

A one-way or check valve 71 located at the top of the air bag 70 along air inlet 70a allows the bag 70 to refill once the modules move apart. Additional one-way valves 74,74 are located at the ends 72a,72a of the exit lines 70b to prevent air from the primary cells 41 from flowing back into the air bag 70. Floatation devices 72b,72b may be attached to the exit lines 70b,70b to ensure that the exit lines 70b exhaust to the primary cells 41,41.

The air bag 70 may be constructed of a resilient material which returns to the expanded state and refills with air once the walls move apart. Alternatively, air may also be replenished with an air compressor. Of course, the provision of an air compressor would increase the maintenance and initial costs of the island.

As shown in FIGS. 10 and 11, a sump 100 may be built into the platform 105 of a module to provide for water collection, septic tanks, or the growing of plants. A sump 100 is defined by sump walls 101 extending downwardly from the platform 105 of a module. A sump floor 102 joins the sump walls 101 to form the sump 100. FIG. 10 shows a sump used for water collection. A sand filter SF and a layer of sand SA provide the necessary filtration. A filter support 106 provides support for the sand filter SF. The sand filter SF may also be supported by filling the sump with gravel P. A layer of soil S is placed over the layer of sand SA. A pump 103 may be used to transport water from the sump. In FIG. 11, a septic tank 115 is placed in the sump. A leach field 120 is provided above the tank 115.

It is also contemplated, according to the invention, to provide a floating dock 75 including hollow dock elements 76 as shown FIGS. 5 and 6. Each element 76 of the floating dock may be constructed of a lightweight material such as plastic. The floating dock elements may be configured with tapered sidewalls, so the dock elements may be stacked within each other like cups when not in use or for shipping convenience.

Each of the floating dock elements may include a platform 80 with tapered sidewalls 82 extending downward for immersion into the water. The illustrated floating dock elements are hexagonal, but may be of any polygonal shape.

It is advantageous to configure the island modules and dock elements as hexagonal shapes for ease of connection and sufficient solidity to the otherwise flexible island.

Adjoining dock elements may be connected along the platform 80 and the bottom of the sidewalls 82. The elements may be connected at the top by a plastic connection plate 85 which spans the modules. The plate is fastened to the modules with stainless steel fasteners or pins 86. The connection plate 85 facilitates travel from one module to another.

The modules are connected at the bottom of the sidewalls by placing a male straight portion 83 attached to a sidewall 82 into a female lip 84 of an adjacent sidewall 82. The male and female members 83,84 are alternately attachments to the sidewalls of a module. A plate 80a of composite material may be affixed to the platform 80. A nonslip skin may be applied to the composite platform 80a and the connection plate 85 to minimize the chances of a person slipping or falling when moving from one module to another. Any number of dock elements 76 may be connected to the artificial island.

Figure 13:
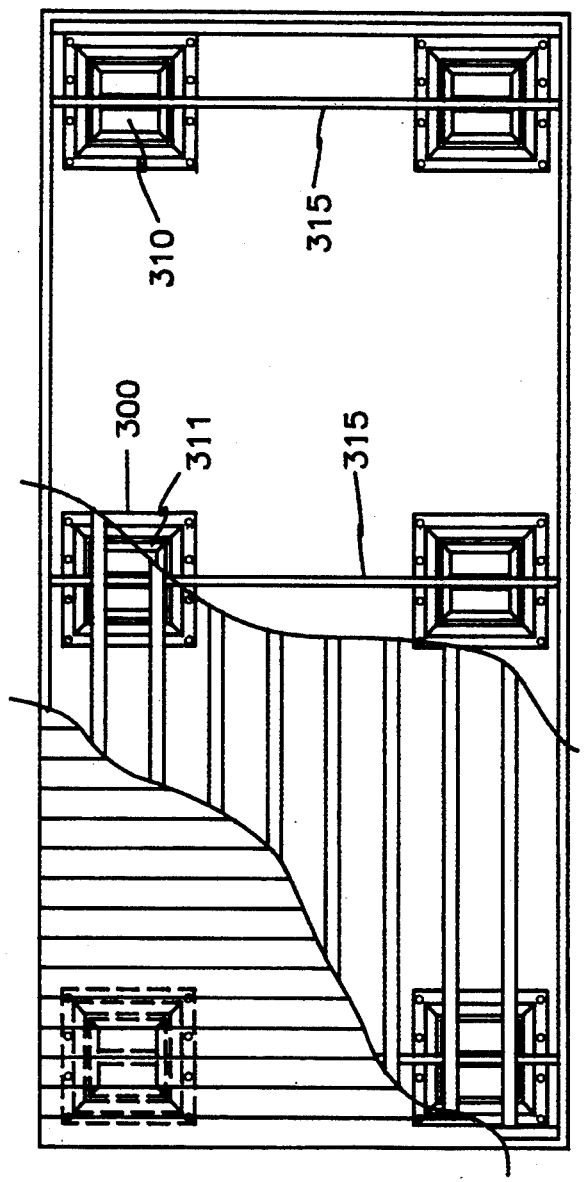
FIG. 13 is a plan top view, partially cut away, of a floating dock embodiment which consist of floating dock modules attached to a wood deck.
Figure 12:
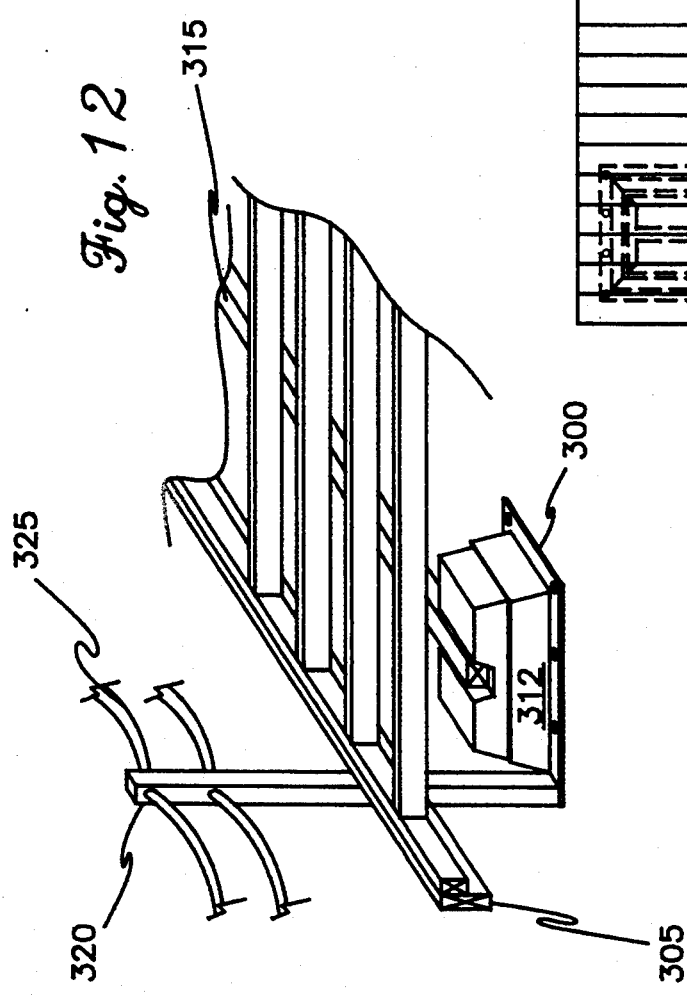
FIG. 12 is a perspective view, partially cut away, of a floating dock embodiment which consist of floating dock modules attached to a wood deck.

An alternative embodiment of the floating dock is show in FIG. 12 and FIG. 13. In this embodiment, six hollow floating dock elements 300 are attached to a wood deck 305. The dock elements 300 are made of fiberglass reinforced plastic. Each of the floating dock elements may include a platform 310 with sidewalls 312 which slope away from the platform 310 and extending downward for immersion into the water. The sidewalls may include stiffening flanges 311. The elements's platforms 310 are attached to the stiffening ribs 315 of the deck 305. Guard posts 320 and guard rails 325 may be provided for the deck. In another alternative embodiment (not shown), a floating dock may also be constructed by attaching the bottoms of containers, such as trash cans, to a wood deck.

Figure 7:
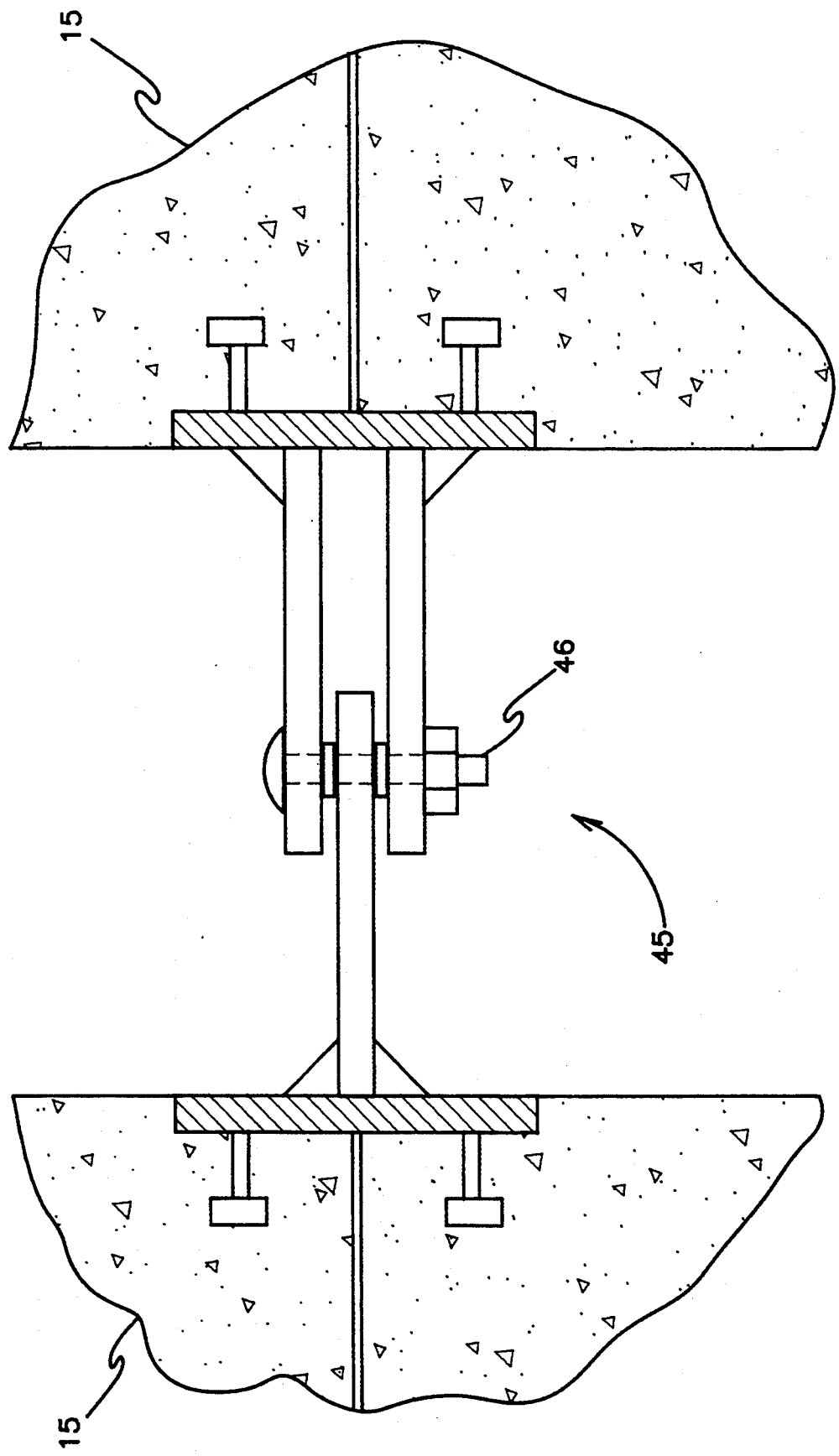
FIG. 7 is a top plan view in partial cross-section of a hinge connection with the boardwalk omitted for clarity.

FIG. 7 shows a top view of adjacent modules 15 and hinge connection 45 with connecting rod or bolt 46. A washer and lock washer may be added to ensure that the hinge connection 45 and connecting rod 46 remain in contact. The hinge connection 45 permits relative movement between the adjacent modules.

Figure 8:
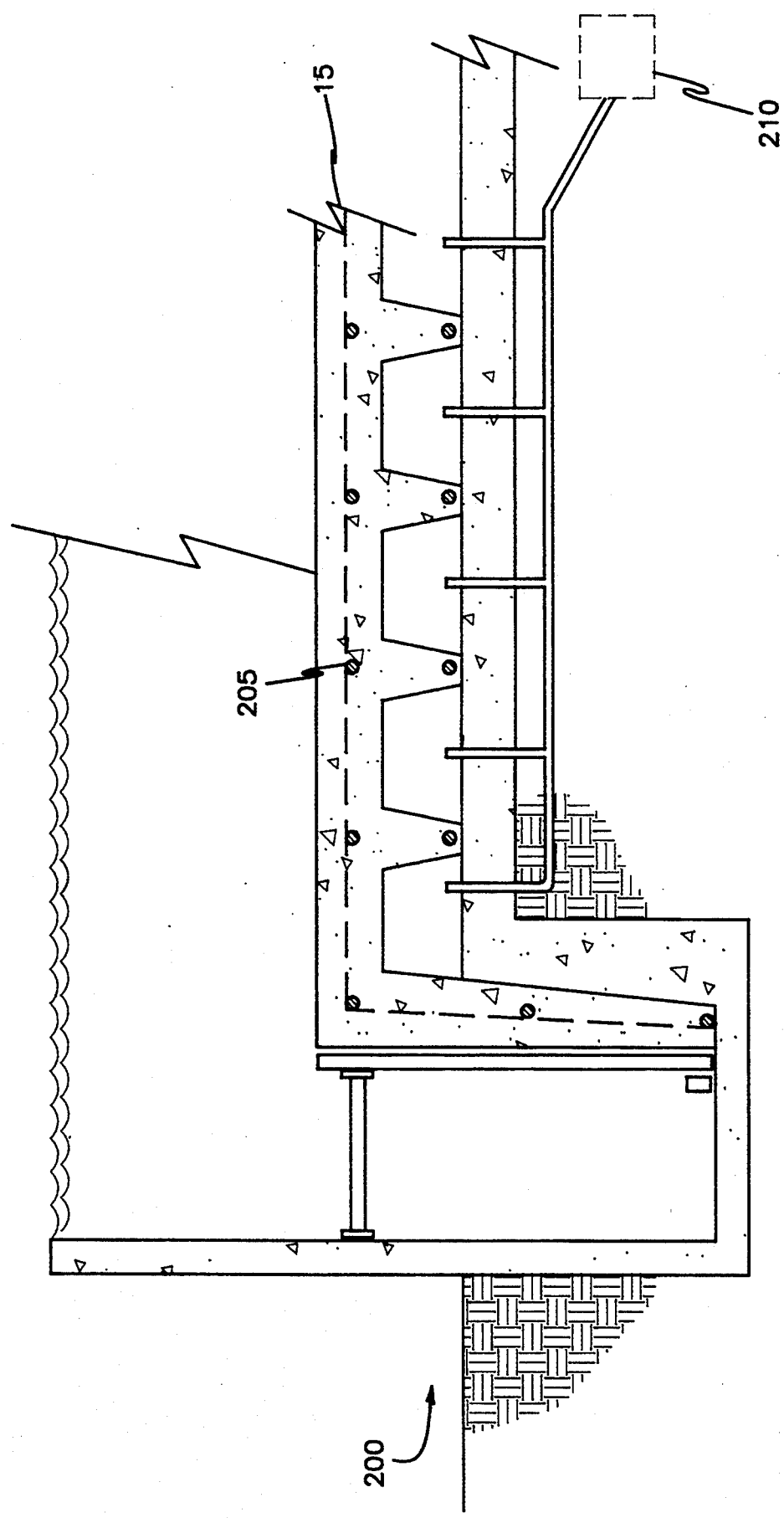
FIG. 8 is a sectional view of a dry dock area for forming a module.

FIG. 8 shows a dry dock area 200 for forming a module 15 including reinforcing bars 205. Concrete may be poured into dry dock 200 about reinforcing bars 205 in a mold (omitted for clarity). After curing for approximately seven days, or as necessary, a sea wall (not shown) may be removed or opened to flood the dry dock area. Pressurized fluid source 210 is also actuated to force a fluid such as air against the hollow interior of module 15, so the module will separate from the mold and float upwardly. The module may then be moved out into the body of water.

Figure 9:
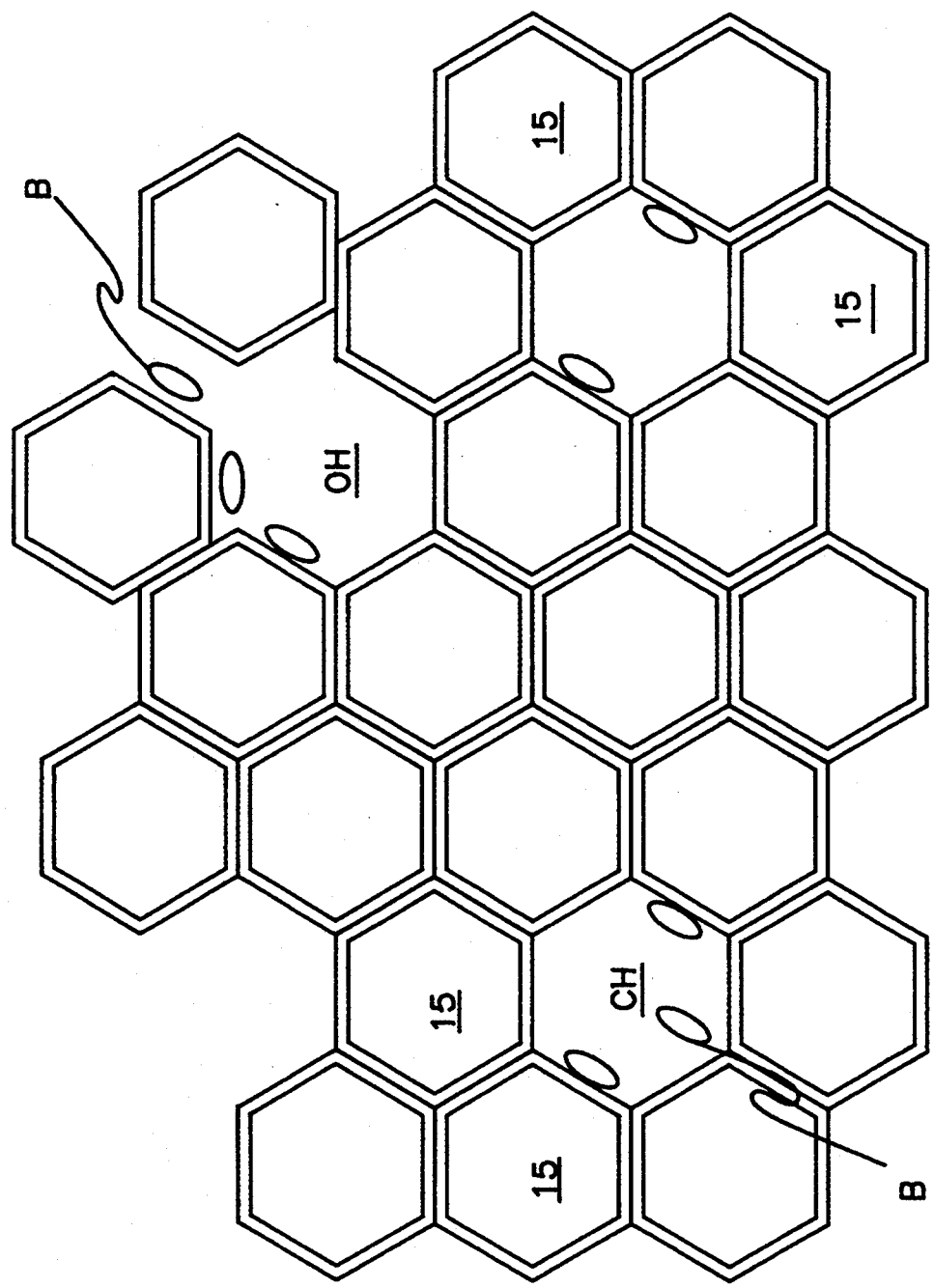
FIG. 9 is a top plan view of an artificial island with an open protected harbor and two closed harbors for boats. Similar reference characters denote corresponding features consistently throughout the attached drawings.

FIG. 9 shows an artificial island and boats B located in open harbor OH and closed harbor CH. The hinged connections between the modules 15 have the advantage of permitting modules 15 to be detached and moved by a tug boat or ferry to provide harbor areas.

It is to be understood that the present invention is not limited to the preferred embodiments described above, but encompasses any and all embodiments within the scope of the following claims.

I claim:

1. An artificial floating island defining a plurality of modules, each of said modules comprising at least:
   an upper platform;
   primary vertical walls depending from said upper platform, said primary vertical walls terminating in free lower edges immersed in a body of water, thus trapping air in a space bounded by said platform, said primary vertical walls, and an upper surface of the water to form cells, each one of said cells augmenting the buoyancy of its associated module;
   a plurality of secondary side walls depending from said upper platform, said secondary side walls being arranged to subdivide each said cell into secondary cells, said secondary walls having bottom surfaces, each one of said secondary walls being shorter than each one of said primary walls;
   hinge means for connecting adjacent modules;
   means for replenishing air beneath each said cell; and
   a boardwalk spanning adjacent said modules, said boardwalk having opposing ends, means for flexibly attaching each of said opposing ends to each adjacent said module.

2. The artificial floating island of claim 1, wherein said means for replenishing air comprises an elastomeric, collapsible, bag disposed between said modules.

3. The artificial floating island of claim 1, wherein said means for replenishing air comprise a self-inflating, collapsible, bag disposed between adjacent said modules, means for conducting air into said bag and to each one of said spaces, a first check valve for trapping air in said bag, and at least one additional check valve for preventing air from reentering said bag after exiting therefrom.

4. The artificial floating island of claim 1, wherein said means for replenishing air comprises an elastomeric bag, and a bumper element, said bag and said bumper disposed between said modules.

5. The artificial floating island of claim 1, wherein said modules are hexagonal in shape.

6. The artificial floating island according to claim 1, including:
   a sump defined by sump walls extending downwardly from said upper platform, and a sump floor joining said sump walls to form a depression in said upper platform, whereby said sump may be used for fresh water storage or placement of a septic tank.

7. An artificial floating island comprising:
   a plurality of modules, each of said modules comprising an upper platform hexagonal in shape, primary vertical walls depending from said platform, said primary vertical walls terminating in free lower edges immersed in a body of water, thus trapping air in a space bounded by said platform, said primary vertical walls, and an upper surface of the water to form cells, each one of said cells augmenting the buoyancy of its associated module, a plurality of secondary side walls depending from said platform, said secondary side walls being arranged to subdivide each said cell into secondary cells, said secondary walls having bottom surfaces, each one of said secondary walls being shorter than each one of said primary walls;

hinge means for connecting adjacent said modules;

means for replenishing air beneath each said cell, said means comprising a self-inflating, collapsible, bag disposed between adjacent said modules, means for conducting air into said bag and to each one of said spaces, a first check valve for trapping air in said bag, and at least one additional check valve for preventing air from reentering said bag after exiting therefrom, and a bumper element, wherein said bag and said bumper are disposed between said modules;

a boardwalk spanning adjacent said modules, said boardwalk having opposing ends, means for flexibly attaching each of said opposing ends to each adjacent said module; and a sump defined by sump walls extending downwardly from said upper platform, and a sump floor joining said sump walls to form a depression in said upper platform, whereby said sump may be used for fresh water storage or filled with soil to allow the planting of trees.

* * * * *